J. E. HILL.
AUTOMATIC POTATO PILER.
APPLICATION FILED JUNE 15, 1909.
968,562.
Patented Aug. 30, 1910.
2 SHEETS—SHEET 1.
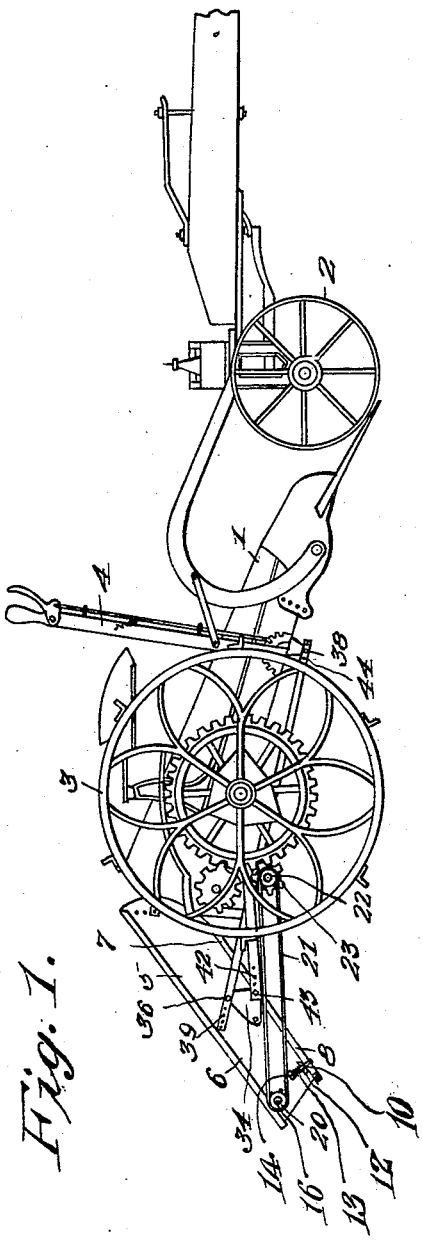

J. E. HILL.
AUTOMATIC POTATO PILER.
APPLICATION FILED JUNE 15, 1909.
968,562.
Patented Aug. 30, 1910.
2 SHEETS—SHEET 2.
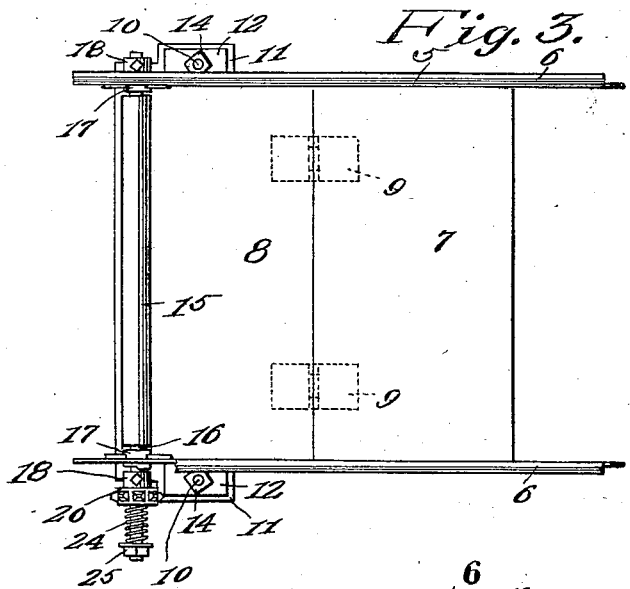
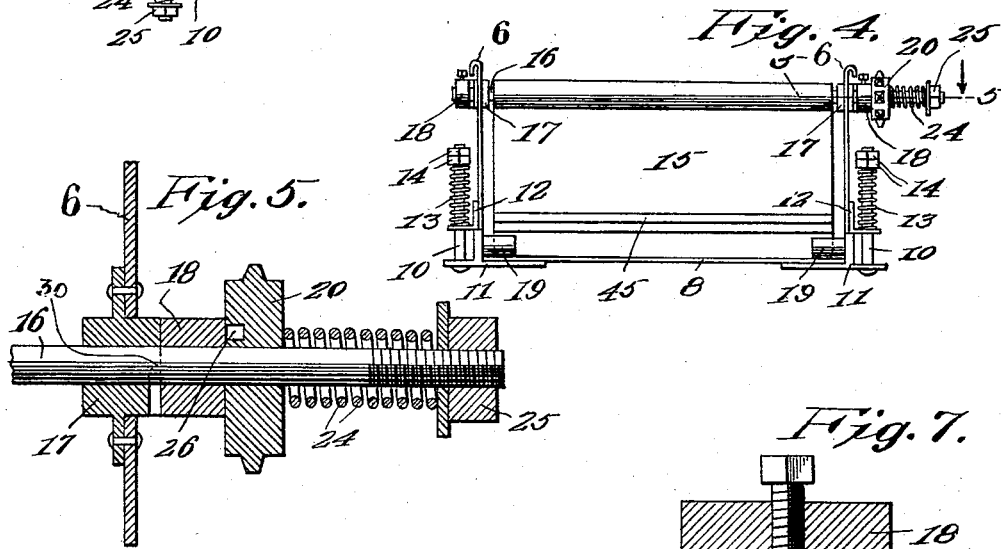
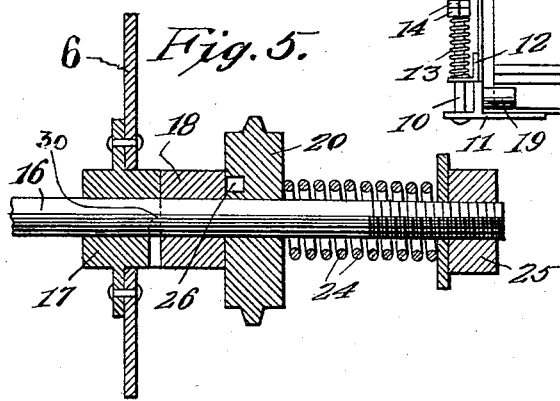
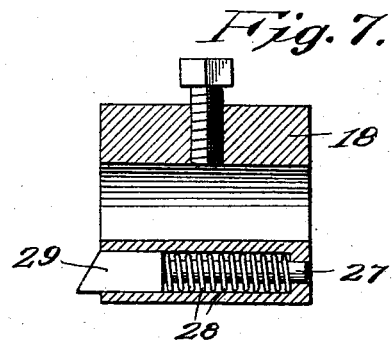
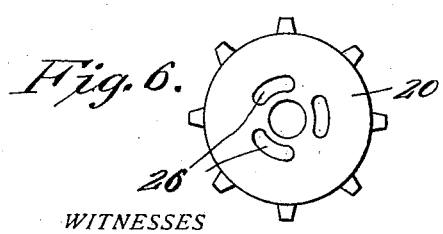
WITNESSES
James F. Crown
E. M. Ricketts
INVENTOR
J. E. Hill
By Watson E. Coleman
Attorney

UNITED STATES PATENT OFFICE.

JAMES E. HILL, OF TWIN FALLS, IDAHO.

AUTOMATIC POTATO-PILER.

968,562.  Specification of Letters Patent.  Patented Aug. 30, 1910.

Application filed June 15, 1909. Serial No. 502,395.

*To all whom it may concern:*

Be it known that I, JAMES E. HILL, a citizen of the United States, residing at Twin Falls, in the county of Twin Falls and State of Idaho, have invented certain new and useful Improvements in Automatic Potato-Pilers, of which the following is a specification, reference being had to the accompanying drawings.

This invention relates to improvements in automatic dumping devices for use on agricultural implements or machines and more particularly to one especially adapted for use on a potato digger to automatically place the potatoes in piles upon the ground without the assistance of the person attending the potato digger.

One object of the invention is to provide a simple and practical mechanism of this character which will be entirely automatic in operation.

Another object of the invention is to provide a mechanism of this character which may be readily applied to various kinds of potato diggers, beet harvesters or other vegetable harvesting machines.

Another object of the invention is to provide a mechanism of this character which will be automatically raised and lowered when the digging mechanism is adjusted.

With the above and other objects in view, the invention consists of the novel features of construction and the combination and arrangement of parts hereinafter fully described and claimed, and illustrated in the accompanying drawings, in which—

Figure 1 is a side elevation of a potato digger showing the application of the invention thereto; Fig. 2 is an enlarged side elevation of the potato piler or dumper removed from the digging machine; Fig. 3 is a top plan view of the same; Fig. 4 is a rear end view; Fig. 5 is a detail section taken on the plane indicated by the line 5—5 in Fig. 4; and Figs. 6, 7 and 8 are detail views of the automatic clutch mechanism.

In the drawings 1 denotes the body of a digging machine of well known form and construction. This body is supported by front and rear wheels 2, 3 and is vertically adjustable by means of a hand lever 4.

5 denotes the body of my improved automatic potato piler or dumper, said body being in the form of a downwardly and rearwardly inclined receptacle into which the potatoes or other vegetables are discharged by the elevating mechanism of the digging machine. The body or receptacle 5 may be mounted upon the rear of the digging machine in any suitable manner and it may be of any desired form and construction. As illustrated, however, it has sides 6 united to a stationary upper section 7 of the bottom. The lower section 8 of the bottom is hinged, as shown at 9, to the lower edge of the section 7 and it is yieldably supported by spring devices consisting of sliding rods or bolts 10 attached at their lower ends to bracket plates 11 on the side edges of the bottom section 8 and having their upper portions slidable in guide brackets 12 on the outer faces of the sides 6. Coil springs 13 are arranged on the projecting upper ends of the bolts 10 and are adjusted by means of nuts 14, whereby the tension of the hinged bottom section 8 may be varied.

The body 5 has a swinging end gate 15 which is held closed by the hinged bottom section 8 and adapted to be released by the same when a quantity of potatoes weighing a predetermined amount are deposited in the body or receptacle 5. Said end gate 15 has its upper edge fixed to a transverse shaft 16 rotatable in bearings 17 on the sides 6, endwise movement of said shaft being prevented by stop collars 18 arranged on said shaft outside of the sides 6 and held in position by set screws. The end gate 15 is preferably made of slightly less size than the end of the body 5 so as to leave spaces between its ends and bottom, as shown in Fig. 4, and its free bottom edge is adapted to be engaged by notched lugs 19 provided upon the bottom section 8 whereby the end gate will be retained in its closed position when the hinged bottom section 8 is elevated and released when said bottom section is lowered by the weight of potatoes upon the same. For the purpose of automatically returning the end gate to its closed position after the potatoes have been dropped from the body, a rotary element 20 is loosely arranged on one of the projecting ends of the shaft 16 and constantly driven from the potato digging machine. This element is preferably in the form of a sprocket wheel or pinion and is connected by a sprocket chain 21 to a sprocket wheel 22 carried by one of the rotating gears or wheels 23 of the potato digger and driven from one of the ground wheels 3 of the same. The sprocket wheel 20 forms one member of a clutch, the other member of which latter is formed by the adjacent collar 18. Said sprocket wheel 20 is pressed against said collar by a coil spring 24 arranged on the projecting end of the shaft 16 between it and a nut or adjustable stop 25 on said shaft. The inner end of the hub of the sprocket wheel 20 is formed with an annular series of elongated recesses or openings 26 into any one of which is adapted to be forced the end of a spring retracted clutch bolt 27 slidably arranged in a longitudinal opening in the collar 18. Said bolt 27, as shown more clearly in Fig. 7, is retracted by a coil spring 28 and its other end is provided with a beveled face 29 which coacts with a cam shoulder 30 formed upon the adjacent outer end of the adjacent bearing 17, as shown more clearly in Fig. 8 of the drawings.

The parts just described are so constructed and arranged that when the swinging bottom section 8 drops by reason of the weight of the potatoes on the same and releases the end gate 15, the latter will be swung rearwardly by the discharging potatoes and in so doing will rotate the combined stop collar and clutch member 18 so that the beveled end 29 of the bolt 27 will be moved into engagement with the cam shoulder 30 on the stationary bearing 17 and be projected outwardly against the tension of the spring 28. This movement of the bolt will cause its outer end to enter one of the recesses or openings 26 in the constantly rotating sprocket wheel or clutch member 20 and the movement of the latter will be thereupon imparted to the shaft 16 to swing the end gate to its closed position. When the end gate returns to such position the end 29 of the bolt leaves the cam shoulder 30 so that the spring 29 retracts the bolt 27. It will thus be seen that the operation of the piling or dropping mechanism is entirely automatic.

When it is desired to mount the body or receptacle 5 so that it will be automatically raised and lowered when the digging mechanism on the body 1 is raised and lowered, the forward or upper portions of the side plates 6 of the body are adjustably pivoted at 31 to the body 1 of the digging machine. The lower and rear portion of the body 5 is supported from the axle of the wheels 3 by means of two rods 32, the forward ends of which are connected to collars 33 on said axle, and the rear ends of which are pivoted to bell cranks 34 preferably of triangular-shape and pivoted at 35 to the sides 6 of the body. The third arms of the bell cranks 34 have pivotally connected to them, as at 36, links or levers 37 which extend forwardly and downwardly and are pivoted at 38 to the intermediate portion of the body 1 of the digging machine. By mounting the body 5 in this manner, it will be seen that when the lever 4 is shifted to raise or lower the body 1, the body 5 will be correspondingly and automatically raised or lowered. The connection of the links or levers 37 with the bell cranks 34 is preferably made adjustable by forming in the rear ends of the links or levers 37 longitudinal series of openings 39 in any one of which may be placed the pivots 36. The connection 31 between the body 5 and the body 1 is also preferably made adjustable so as to permit the use of the invention on different kinds of digging or harvesting machines, said adjustment 31 consisting preferably of a connecting bar 40 adapted to be attached to the body 1 and having an adjustable connection with the body 5 by arranging the pivot 31 in any one of a series of openings 41 formed in the sides 6 of the body 5. If desired, the connection between the rear ends of the arms or links 32 and the bell cranks 34 may be made adjustable, for instance, by forming said arms or links 32 with longitudinal series of openings 42 any one of which may receive a pivot bolt or fastening 43. If desired, the forward ends of the links or levers 37 may be made adjustable in a similar manner, that is, by providing them with longitudinal series of openings 44 to receive the pivots 38.

The body 5 is preferably, but not necessarily, constructed of galvanized sheet metal so as to withstand the weather and its various parts may be suitably reinforced. The bottom sections 7, 8 and the end gate 15 may be strengthened by longitudinal reinforcing strips 45 of angular shape in cross section.

From the foregoing detail description it is thought that the construction, operation and advantages of the invention will be readily understood by those familiar with machines of this character.

While I have shown and described in detail the preferred embodiment of my invention, I wish it understood that I do not limit myself to the construction set forth since various changes in the form, proportion and arrangement of parts and in the details of construction may be resorted to within the spirit and scope of the invention.

Having thus described the invention what is claimed is:

1. The combination with a vegetable harvesting machine, of a vegetable-receiving receptacle, a movable end gate, a spring device for holding said end gate closed and controlled by the weight of the contents of the receptacle, whereby said end gate is automatically released, and means for returning the end gate to its normal or closed position.

2. The combination with a vegetable harvesting machine, of a vegetable receiving receptacle having an inclined bottom, a movable end gate, a holding means for said end gate controlled by the weight of the contents of the receptacle, whereby said end gate is automatically released and means for returning the end gate to its normal or closed position.

3. The combination with a vegetable harvesting machine, of a vegetable receiving receptacle having an inclined bottom, a movable end gate, a holding means for said end gate controlled by the weight of the contents of the receptacle, whereby said end gate is automatically released and means actuated from said machine for returning the end gate to normal position.

4. The combination with a vegetable harvesting machine, of a vegetable receiving receptacle having an inclined bottom, a movable end gate, a holding means for said end gate controlled by the weight of the contents of the receptacle, whereby said end gate is automatically released and automatic means for returning the end gate to normal position.

5. The combination with a vegetable harvesting machine, of a vegetable receiving receptacle having an inclined bottom, a swinging end gate for said receptacle, a holding means for said end gate controlled by the weight of the contents of the receptacle and adapted to automatically release said gate, a constantly driven member operated from said machine and means for operatively connecting said member to the end gate when the latter moves to open position, whereby said end gate will be automatically returned to its closed position.

6. The combination with a vegetable harvesting machine, of a vegetable receiving receptacle having an inclined bottom, a swinging end gate for said receptacle, a holding means for said end gate controlled by the weight of the contents of the receptacle and adapted to automatically release said gate, a driving element actuated from said machine, a normally inoperative clutch device between said driving element and the pivot of said end gate and means controlled by the movement of the end gate for controlling said clutch device, whereby the end gate will be automatically returned to its normal position.

7. The combination with a vegetable harvesting machine, of a vegetable receiving receptacle having an inclined bottom, a swinging end gate for said receptacle, a holding means for said end gate controlled by the weight of the contents of the receptacle and adapted to automatically release said gate, a pivot shaft for said end gate, sprocket chain gearing between the machine and said shaft, said gearing including a sprocket wheel loose on the shaft, the hub of said sprocket wheel having a seat, a member fixed to the shaft, a spring pressed bolt longitudinally slidable in said member and adapted to be projected into the seat in said sprocket wheel, whereby the shaft will be actuated by the latter, and a stationary cam to project said bolt.

8. The combination with a vegetable harvesting machine, of a vegetable receiving receptacle having an inclined bottom provided with a swinging section, a spring device for maintaining the swinging bottom section in normal position and a movable end gate for the receptacle maintained in closed position by said swinging bottom section.

9. The combination with a vegetable harvesting machine, of a vegetable receiving receptacle having an inclined bottom provided with a swinging section, a spring device for maintaining the swinging bottom section in normal position, a movable end gate for said receptacle maintained in closed position by said swinging bottom section and means actuated from said machine for returning the end gate to closed position.

10. The combination with a vegetable harvesting machine, of a vegetable receiving receptacle having an inclined bottom provided with a swinging section, a spring device for maintaining the swinging bottom section in normal position, means for adjusting said spring device and a movable end gate for said receptacle maintained in closed position by said swinging bottom section.

11. The combination with a vegetable harvesting machine, of a vegetable receiving receptacle having an inclined bottom provided with a movable section, a spring device for supporting said movable section and a movable end gate for the receptacle maintained in closed position by said movable bottom section.

12. The combination with a vegetable harvesting machine, of a vegetable receiving receptacle having an inclined bottom and a swinging section in said bottom, a spring device for supporting said swinging bottom section, a swinging end gate for said receptacle, means carried by the swinging bottom section to engage the end gate and maintain it in closed position, and means actuated from said machine for returning the end gate to closed or normal position.

In testimony whereof I hereunto affix my signature in the presence of two witnesses.

JAMES E. HILL.

Witnesses:
 GEORGE LACY,
 J. MCMILLAN.